July 23, 1929. W H. JOLLY 1,722,224
ELECTRIC TOASTER
Filed June 29, 1928

INVENTOR.
W. H. Jolly
BY
Victor J. Evans ATTORNEYS.

Patented July 23, 1929.

1,722,224

UNITED STATES PATENT OFFICE.

W. HUGH JOLLY, OF FLORENCE, ALABAMA.

ELECTRIC TOASTER.

Application filed June 29, 1928. Serial No. 289,214.

This invention relates to an electric toaster for toasting bread and the like, the general object of the invention being to provide a pair of plates so arranged that the slices of bread or the like can be placed between them, with means for heating the plates to toast both sides of the bread at the same time, with means for adjusting one plate in relation to the other to suit different thicknesses of slices.

Another object of the invention is to hingedly support the upper plate so that it can be swung away from the lower plate in order to place the slices between the plates.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:—

Figure 1:
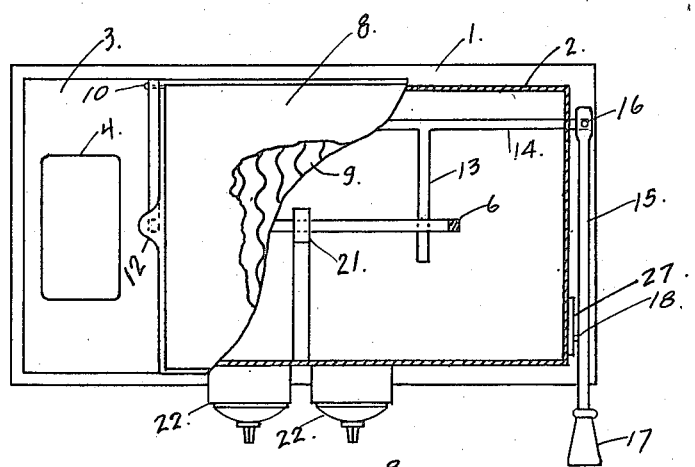
Figure 1 is a plan view with parts broken away to show the internal mechanism.
Figure 2:
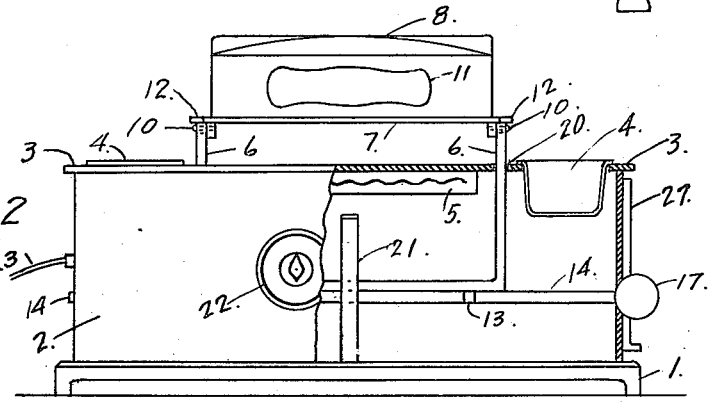
Figure 2 is a front view with parts broken away.
Figure 3:
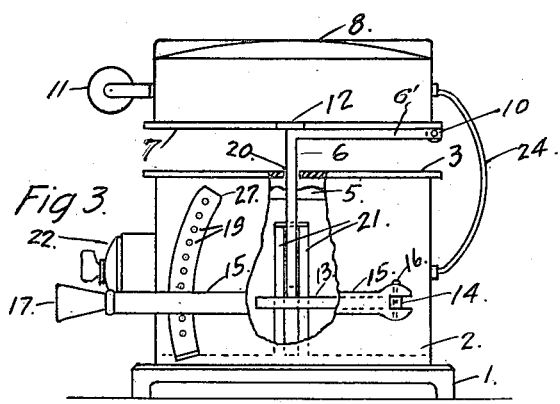
Figure 3 is a side view with parts broken away.

In these views, the numeral 1 indicates a base to which the sides and ends 2 are connected and 3 indicates a plate connected with the sides, it being seen that the base, sides and plate form a casing in which is arranged a heating coil 5 so placed that it will heat the plate 3. An opening is formed adjacent each end of the plate and butter receptacles 4 are placed in said openings so that the butter can be melted by the heat in the casing produced by the heating medium 5.

A U-shaped member is arranged in the casing with its limbs 6 passing through holes 20 in the plate 3. These limbs 6 are bent at rightangles and extend rearwardly, as shown at 6'. A plate 7 has its rear edge hingedly connected with the ends of the parts 6', as shown at 10, and lugs 12 are formed on the ends of the plate and rest upon the inner ends of the parts 6' so that the plate 7 is normally held in horizontal position and parallel with the plate 3. A casing 8 is carried by the plate 7 and contaians a heating coil 9, this coil acting to heat the plate 7. A handle 11 is connected with the front of the casing so that the casing and the plate 7 can be swung rearwardly in order to enable slices of bread or the like to be placed on the plate 3.

The U-shaped member is guided for vertical movement by the guiding members 21 in the lower casing, these guiding members being so arranged as to receive between them portions of the limbs 6.

A shaft 14 has its ends journaled in the ends of the lower casing and said shaft is provided with the arms 13 which pass under parts of the bights of the U-shaped members and a lever 15 having a handle 17 at its outer end is pivotally connected with a projecting end of the shaft 14 by a pin 16. This lever carries a pin 18 which is adapted to engage any one of a number of holes 19 in a quadrant 27 so that by moving the lever downwardly a slight distance, the pin 18 can be disengaged from a hole 19 and then by moving the lever either downwardly or upwardly and then inwardly, the pin 18 can be engaged with any desired hole 19 in the quadrant.

As the shaft 14 is rocked by the lever, its arms will cause vertical movement of the U-shaped member so that the limbs 6 thereof will raise or lower the plate 7 and thus said plate 7 can be adjusted to suit any desired thickness of bread which is to be toasted.

Conductors 23 are connected with the coil 5 and lead to a suitable source of supply and conductors 24 are connected with the upper coil 9. Standard three or four-way switches 22 control the flow of current to the coil.

From the foregoing it will be seen that by swinging the upper casing and the plate 7 rearwardly, the slices of bread can be placed on the plate 3 and then the plate 7 and casing 8 are moved back to their normal position so that both plates will be parallel and contact the bread so that when the current is turned on, both faces of the bread will be toasted simultaneously. The plate 7 can be adjusted in relation to the plate 3 by moving the lever 15, and said plate 7 should be so positioned that its full weight will not come upon the bread.

It is thought from the foregoing description that the advantages and novel features be made in the construction and in the com- of my invention will be readily apparent.

It is to be understood that changes may bination and arrangement of the several parts, provided that such changes fall within the scope of the appended claim.

What I claim is:—

A device of the class described comprising a lower casing having its top forming a toasting plate, an upper casing having its bottom forming a lower toasting plate, uprights passing through the top of the lower casing and having rearwardly extending horizontal portions at their upper ends, means for hinging the bottom of the upper casing to the ends of said portions, lugs on the ends of the bottom of the upper casing engaging said portions for supporting the upper casing in horizontal position, a shaft journaled in the lower casing, arms on the shaft extending under portions of the uprights, a hand lever pivotally connected with the shaft whereby the shaft can be rocked to cause its arms to move the uprights vertically, a quadrant connected with the lower casing and having holes therein, a pin on the hand lever for engaging any one of said holes for holding the parts in adjusted position, heating coils in the casings, circuits for the coils, switches for controlling the circuits and a handle on the upper casing whereby the same can be moved on its hinges.

In testimony whereof I affix my signature.

W HUGH JOLLY.